United States Patent
Swann (10) Patent No.: US 10,259,590 B2
(45) Date of Patent: Apr. 16, 2019

(54) AIRCRAFT PROPULSION SYSTEM

(71) Applicant: ROLLS-ROYCE PLC, London (GB)

(72) Inventor: Peter Swann, Derby (GB)

(73) Assignee: ROLLS-ROYCE plc, London (GB)

( * ) Notice: Subject to any disclaimer, the term of this patent is extended or adjusted under 35 U.S.C. 154(b) by 424 days.

(21) Appl. No.: 15/079,273

(22) Filed: Mar. 24, 2016

(65) Prior Publication Data

US 2016/0304211 A1 Oct. 20, 2016

(30) Foreign Application Priority Data

Apr. 16, 2015 (GB) .................................. 1506473.6

(51) Int. Cl.
| | |
|---|---|
| *B64D 31/06* | (2006.01) |
| *B64D 27/24* | (2006.01) |
| *B64D 27/02* | (2006.01) |

(52) U.S. Cl.
CPC ............. *B64D 31/06* (2013.01); *B64D 27/24* (2013.01); *B64D 2027/026* (2013.01); *Y02T 50/44* (2013.01); *Y02T 50/62* (2013.01)

(58) Field of Classification Search
CPC .. B64D 31/06; B64D 27/24; B64D 2027/026; Y02T 50/44; Y02T 50/62; F02D 41/0235; F02D 41/1454; F02D 41/146; F02D 41/1461; F02D 2200/0802; F02D 2200/0814; F02D 2200/0816; F02C 9/00; F02C 9/28
See application file for complete search history.

(56) References Cited

U.S. PATENT DOCUMENTS

| | | | | |
|---|---|---|---|---|
| 2,462,201 | A * | 2/1949 | Kilgore | B64D 27/24 244/60 |
| 7,555,893 | B2 * | 7/2009 | Okai | B64D 27/24 244/1 R |
| 2008/0072577 | A1 | 3/2008 | Taylor et al. | |
| 2009/0145998 | A1 | 6/2009 | Salyer | |
| 2010/0122519 | A1 | 5/2010 | Epstein et al. | |
| 2010/0132330 | A1 | 6/2010 | Noppel et al. | |
| 2013/0094963 | A1 * | 4/2013 | Rolt | B64D 27/02 416/1 |

FOREIGN PATENT DOCUMENTS

| | | |
|---|---|---|
| GB | 2524772 A | 10/2015 |
| GB | 2524774 A | 10/2015 |
| GB | 2524776 A | 10/2015 |
| WO | 2014/158240 A2 | 10/2014 |

OTHER PUBLICATIONS

Aug. 17, 2016 Search Report issued in British Patent Application No. 1604926.4.
Oct. 14, 2015 Search Report issued in British Patent Application No. 1506473.6.

* cited by examiner

*Primary Examiner* — Medhat Badawi
*Assistant Examiner* — Vicente Rodriguez
(74) *Attorney, Agent, or Firm* — Oliff PLC (57) ABSTRACT

An aircraft propulsion system in which a combustion engine is arranged to drive an electrical generator. An electrical energy store is provided within the system. A propulsive rotor is arranged to be driven by an electric motor and a controller selectively varies the supply of power to the electric motor from the generator and/or energy store in dependence on one or more property of a vapor trail resulting from the engine exhaust flow. The controller may also control the supply of power to the energy store for charging.

19 Claims, 5 Drawing Sheets

AIRCRAFT PROPULSION SYSTEM

BACKGROUND OF THE INVENTION

This disclosure concerns aircraft propulsion systems, and more particularly, aircraft propulsion systems in which a propulsive fan is driven by electrical energy derived from an aircraft combustion engine.

Vapour trails are artificial clouds that are visible trails of condensed water vapour caused by combustion products exhausted from aircraft engines. They may be formed as warm, moist exhaust gas mixes with ambient air, and arise from the precipitation of microscopic water droplets or, if the air is cold enough, tiny ice crystals. The term "vapour trails" is intended to refer both to condensation trails (that is to say "contrails") from aircraft and to water and/or ice precipitation in or attributable to the exhaust plumes from engines.

It is understood that, depending on the timescale considered, the climate-warming impact of aircraft exhaust vapour trails and resulting vapour trail-cirrus may be of a magnitude similar to, or perhaps even greater than, that of the $CO_2$ emitted by aircraft, and therefore may represent a significant element of aviation's total climate impact. Various attempts at vapour trail reduction or elimination have been proposed in the prior art.

US2010/0122519 describes the use of ultra-low sulphur aviation fuel as an alternative to conventional fuel to reduce sulphur by-product generation and hence reduce contrail formation.

US2008/072577 discloses suppression of vapour trail formation by reducing exhaust water vapour content through use of a heat exchanger and condenser arrangement. However such equipment potentially introduces significant weight into the engine. Furthermore, the weight penalty is incurred throughout the full duration of a flight, even though vapour trail suppression may only be required for a small percentage of the flight time.

US2010/132330 proposes suppression of vapour trail formation through the use of directed electromagnetic energy into the engine exhaust plume. However the additional energy required to operate the system could represent a significant portion of the engine power and thus incur a fuel-burn penalty. Further, in military applications, the emission of powerful electromagnetic radiation has the undesirable effect of increasing the aircraft's detectability.

Other examples in the prior art suggest attempted modification or suppression of vapour trails through the use of chemicals injected either into the engine or into the exhaust plume. Such solutions present the prospect of additional pollution, incur a weight penalty through the need to carry fuel additives with potentially little or no calorific value of their own, and may present challenges to engine reliability and/or component life.

The strategy of avoiding regions prone to vapour trail formation and/or persistence through the routing of aircraft around, above and/or below such regions has the disadvantage that it increases workload for air traffic control and/or pilots, reduces airspace capacity and, in the case of routing around regions prone to vapour trail formation or persistence (which can be tens or hundreds of kilometers in horizontal extent), the length of the route followed by the aircraft is increased, resulting in a fuel-burn penalty. Additionally in the case of climbing so as to fly above regions prone to vapour trail formation or persistence, additional fuel is burned to provide the increased thrust necessary to perform the climb. If aircraft are scheduled to fly below regions prone to vapour trail formation or persistence, additional fuel may be burned subsequently if the aircraft is to return to its optimal cruising altitude once the aircraft has passed the avoided region.

Prior art proposals for vapour trail mitigation generally assume the use of a traditional gas turbine engine configuration, such as a turbofan engine, in which the propulsive fan is driven by a corresponding turbine via a mechanical link there-between. However certain aircraft engine configurations over recent years have proposed the use of a distributed propulsion system, in which power generated by the engine core is used to drive a generator. The propulsive fan(s) can thus be driven by an electric motor, so as to allow greater flexibility in control between the engine(s) and fan(s).

Although the primary motivation for such alternative engine configurations is improved efficiency and hence reduced emissions of $CO_2$, it has been found that the exhaust of an isolated engine core is prone to contrail formation over a potentially wider range of altitudes and/or atmospheric conditions than that of a conventional turbofan.

It is an aim of the present invention to provide a vapour trail mitigation system that specifically addresses a distributed aircraft propulsion configuration.

BRIEF SUMMARY OF THE INVENTION

According to a first aspect of the invention there is provided an aircraft propulsion system comprising a combustion engine, an electrical generator arranged to be driven by the engine, an electrical energy store and propulsive rotor arranged to be driven by an electric motor, wherein the system comprises a controller for varying the supply of power to the electric motor selectively from the generator and/or energy store in dependence on one or more property of a vapour trail resulting from the engine exhaust flow.

This invention may help to mitigate a contrail-related risk associated with an aircraft architecture in which an isolated engine core drives one or more remote fan via an electrical generator, using energy storage to reduce the peak power requirement from the engine. The invention accommodates a greatly increased susceptibility to contrail formation of an engine core in which the bypass flow is remote from the core outflow. This invention uses the energy storage unit to maintain desired thrust levels while allowing temporary changes in an engine operational setting so as to a) alter the number of soot particles produced per meter of travel and hence modify the optical depth of the contrail and hence reduce its climate warming impact, or b) suppress the formation of the contrail altogether through a change in engine efficiency arising from the throttle change. As a result the invention has the potential to reduce the overall climate impact of the aircraft.

The engine may operate in a default, e.g. optimal efficiency, mode and the controller may alter engine operation away from said default mode. The controller may change one or more operational parameter, e.g. a combustion parameter, of the engine in response to the vapour trail property, such as, for example an engine throttle setting. For a plurality of engines, the controller may alter the one or more combustion parameter for each engine in unison or independently.

The controller may maintain a current or desired thrust output of the propulsive rotor by varying the ratio of the total electrical power supplied to the electric motor between the generator and energy store. The controller may maintain a thrust output according to a thrust demand from the aircraft and/or a default mode of engine operation. The controller may monitor the combined thrust output of the engine and propulsive rotor. The controller may vary the supply of power to the electric motor selectively from the generator and/or energy store so as to ensure the sum of the thrust outputs of the engine and propulsive rotor satisfy/match a current or desired thrust output. The controller may control the operation of the engine, e.g. concurrently with the supply of power to the motor, to ensure current or desired thrust output is achieved.

The controller may vary the supply of power in dependence upon the optical depth of a contrail. Additionally or alternatively, the controller may vary the supply of power in dependence upon the expected lifetime/persistence of the contrail.

The system may or may not comprise a contrail detection sensor, such as for example an optical or acoustic sensor. The system may comprise one or more ambient condition sensor, such as any or any combination of a temperature sensor, a humidity sensor and/or a sunlight sensor. The controller may control the supply of power according to one or more sensed ambient condition indicative of a contrail property, such as for example the level of super-saturation of ambient air with respect to ice.

The controller may alter engine operation to reduce or increase engine soot emissions according to one or more sensed contrail and/or ambient condition. The controller may increase or decrease engine soot emissions according to a sunlight level determination.

The supply of power may be controlled according to a maximum and/or minimum charge threshold for the energy store. The minimum charge threshold may be a non-zero value and the maximum charge threshold may be less than the maximum energy storage capacity. Either or both of the maximum and minimum threshold may be variable over the course of a flight, for example so as to define a charge threshold profile. The maximum/minimum charge thresholds may bound the scope of power supply changes available to the controller.

The controller may control the supply of power and/or engine operation according to a predetermined profile for one or more operational parameter. The profile may be determined in advance of a section of the flight or the flight as a whole. The profile may comprise a plurality of profiles, or a plurality of operational parameter values, corresponding to a plurality of sections of the flight, e.g. in time series.

The flight may be divided into a plurality of sections, whereby the likelihood of contrail mitigation action (i.e. likely deviation from the default operation condition) is determined in advance of said sections. The controller may set operational limits of the engine and/or one or more charge threshold for the energy store in use for a flight section based upon the predetermined likelihood of contrail mitigation for said section and/or one or more further sections of the flight. The flight sections may correspond to flight phases or other flight portions. The operational limits may be set based additionally upon a predetermined/predicted thrust requirement or profile for said section or one or more further sections of the flight.

The controller may vary the supply of power from the generator and/or energy store to the electric motor according to a predicted or measured contrail characteristic due to interaction of the engine exhaust flow with an aircraft wake flow, such as a vortical wake component. The aircraft wake flow may comprise or consist of a wingtip vortex flow. The controller may vary the supply of power from the generator and/or energy store to the electric motor in dependence upon the location of the engine on the airframe relative to a vortex-inducing structural feature of the airframe.

According to a second aspect of the invention, there is provided a data carrier comprising machine readable instructions for the control of one or more processor to output control instructions for operation of an aircraft propulsion system comprising a combustion engine, an electrical generator arranged to be driven by the engine, an electrical energy store and propulsive rotor arranged to be driven by an electric motor, the machine readable instructions controlling: determining of a variation from a default power supply profile from the generator and/or energy store to the electric motor according to a received signal indicative of one or more property of a vapour trail resulting from the engine exhaust flow.

According to a further aspect of the invention, there may be provided a controller for operation within the system of the first aspect and/or under control of the machine readable instructions of the second aspect.

Wherever practicable, any of the essential or preferable features defined in relation to any one aspect of the invention may be applied to any further aspect.

BRIEF DESCRIPTION OF THE DRAWINGS

Practicable embodiments of the invention are described in further detail below by way of example only with reference to the accompanying drawings, of which.

DETAILED DESCRIPTION OF THE INVENTION

Contrails, also known as condensation trails or vapour trails, are line-shaped ice clouds which can form in the exhaust plumes of aircraft engines. The climate impact of a contrail depends upon its longevity, its spatial extent and its optical depth, as well as external factors such as the ambient air temperature, and the strength of incoming sunlight, and the albedo of underlying cloud layers and/or surface.

Contrails reflect incoming sunlight away, exerting a cooling effect (during the day). However, they also absorb outgoing infra-red radiation, leading to a warming impact (day and night). The net effect is a balance of these two effects, and can change during the lifetime of the contrail.

In ambient air of sufficiently low humidity, a contrail is relatively short lived, disappearing in a timescale of seconds to minutes. However, if ambient air is supersaturated with respect to ice, a contrail can persist for tens of minutes or hours, spreading out over time to resemble natural cirrus cloud. Persistent contrails and contrail cirrus are known to be responsible for the great majority of the climate impact associated with contrail formation. When averaged over global aviation as a whole, aircraft spend a relatively small proportion of their flight time in ice super-saturated air. It is therefore possible to exert a material beneficial influence over contrail-related climate impact through interventions carried out during a small proportion of aircraft flying time.

The climate warming impact of a contrail is influenced by (amongst other things) its optical depth which in turn depends upon the number density of contrail ice particles, which can itself be influenced by the number of soot particles emitted by an engine per unit distance traveled, and by the extent to which ice particles can be eliminated after the formation of the contrail.

Initial contrail formation takes place relatively rapidly, and is characterised by a fixed available water vapour budget consisting of the water vapour emitted by the engine plus the ambient water vapour contained in a relatively small volume of ambient air. The number density of condensation nuclei in the engine exhaust plume will influence the size distribution of ice crystals in the very young contrail. Specifically, the smaller the number density of condensation nuclei then the larger will be the initial size of formed ice crystals, and the lower will be the optical depth.

Figure 1:
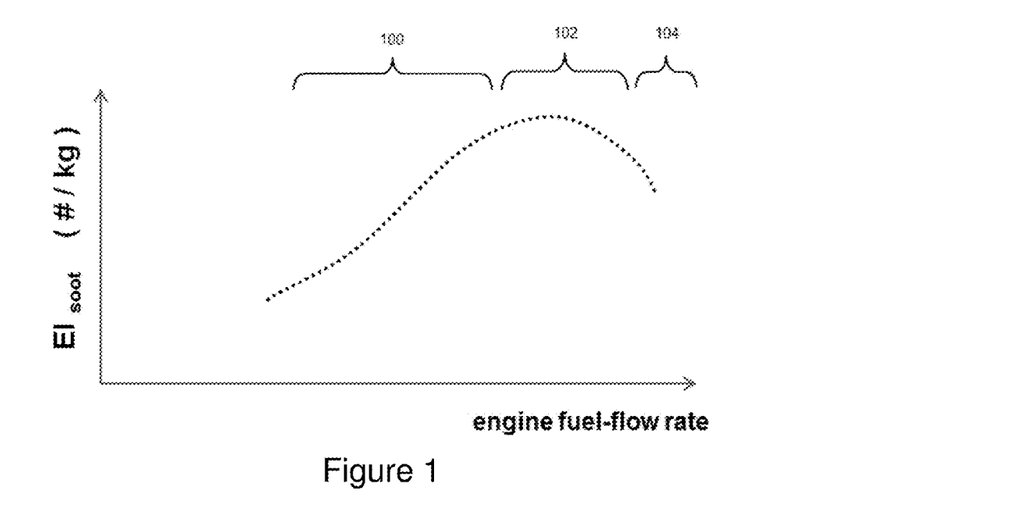
FIG. 1 shows a schematic plot of engine soot emission index against engine fuel-flow rate.

FIG. 1 shows schematically an example plot of variation with engine fuel-flow rate of the soot emission index $EI_{soot}$. $EI_{soot}$ can be defined for the purposes of this disclosure as the number of soot particles emitted per unit mass or volume of fuel burned in the engine. In this example, $EI_{soot}$ increases as fuel flow-rate is increased, until at relatively high fuel-flow rates the high combustion temperatures result in increasing burn-off of soot particles, thus reducing $EI_{soot}$ as fuel-flow rate is increased still further. A different shape of $EI_{soot}$ curve would be obtained for a lean-burn combustor, in which there may be a significant decrease in $EI_{soot}$ at the transition between pilot-only burners and the main burners.

In the general case, there can be defined any or any combination of the following features of the $EI_{soot}$ plot for one or more aircraft engine:
  A region or regions 100 in which $EI_{soot}$ increases with increasing fuel-flow rate, and the magnitude of the rate of increase lies above a first positive threshold;
  A region or regions 104 in which $EI_{soot}$ decreases with increasing fuel-flow rate, and the magnitude of the rate of decrease lies above a second positive threshold;
  A region or regions 102 in which the rate of change of $EI_{soot}$ is relatively small or negligible with variations in fuel-flow rate; or in which $EI_{soot}$ is increasing at a rate whose magnitude lies at or below the first positive threshold; and/or in which $EI_{soot}$ is decreasing at a rate whose magnitude lies at or below the second positive threshold.

The second positive threshold derives from the relationship that, for a fixed $EI_{soot}$, increasing the fuel-flow rate leads to a higher rate of soot emissions per unit time. In order to achieve, at a higher fuel-flow rate, fewer emitted soot particles per meter of travel (i.e. per unit time assuming an unchanged aircraft forward velocity), the rate of change of $EI_{soot}$ with respect to fuel-flow rate must be sufficiently negative that it dominates over the effect upon soot emissions of the increasing fuel-flow rate.

The first positive threshold enables identification of situations in which the rate of change of $EI_{soot}$ with increasing fuel flow rate is insufficiently large to allow material changes in soot emissions per meter of travel to be made via changes in fuel flow rate. The magnitude of the second positive threshold would typically be higher than that of the first positive threshold.

In general, this invention seeks to draw on the above understanding and to implement a contrail mitigation scheme for a distributed propulsion system in which one or more engine drives one or more electrical generator, producing electrical energy which can be stored in one or more storage unit and/or used to drive one or more electrically-powered propulsive fan. The invention may be used to vary the throttle, or other operational, setting of the engine(s) so as to affect the number of soot particles emitted by an engine per meter of travel, due to the change of fuel-flow rate and due also to the variation of soot emission index with changing fuel-flow rate. The variation away from a 'normal' or optimal-efficiency operational setting may be implemented in response to ambient conditions indicative of persistent contrail formation, or else sensing of a contrail itself. The variation may be accommodated by selectively diverting power to/from an energy store so as to ensure the desired thrust output of the propulsive fan(s) is achieved.

In determining how best to adjust engine operation to mitigate against the negative climate impact of contrail formation, engine efficiency is an important consideration in order to ensure the negative climate impact of reduced engine efficiency does not outweigh the benefit in mitigating contrail formation. In doing so, certain embodiments of the invention described herein take advantage of the variation with ambient conditions of the strength of contrail ice-particle elimination within the aircraft's wingtip vortices. An overview of such a process is provided below and examples of such systems are explained below with reference to FIGS. 2-5.

During operation, the exhaust plumes of engines located sufficiently close to the wingtips will become at least partially entrained in the aircraft's wingtip vortices. Contrail-forming particles entrained in the vortices are subject to adiabatic heating due to descent of the vortex. As a result, ice mass is lost from the surface of the ice particles via sublimation, leading to elimination of some of the particles having the smallest diameter/size, thereby leading to a reduction in the optical depth of the contrail downstream of the vortex region. This effect is particularly relevant on relatively large/heavy aircraft for which the wingtip vortices are strong in nature.

Ice particles entrained and retained within the wingtip vortices for the entire lifetime of the wingtip vortices constitute the aircraft's primary wake and are subject to greater heating. Ice particles which remain un-captured by wingtip vortices, and ice particles which become detrained from the wingtip vortices prior to vortex breakup, together constitute a secondary wake. The contribution of one or more engine to the primary and secondary wake will depend on the precise location of the engine(s) relative to the wingtip and/or aircraft centerline.

Variation in pre-vortex ice particle size distribution can influence the particle size distribution, and hence the optical depth, of the post-vortex contrail. This is at least in part because pressure is typically lower than ambient pressure within the core of a vortex, and, as a result, the temperature is also lower. Therefore the relative humidity within the vortex core is higher than in the ambient air at least initially. If this relative humidity is such that the air within the vortex core is supersaturated with respect to ice, then any ice particles trapped within the core can grow as a result of a deposition process. However ice particle growth will reduce the level of super-saturation within the vortex core. Furthermore the vortex core will descend over time and hence experience adiabatic heating which further reduces the relative humidity within the vortex core and, if the reduction in relative humidity is sufficient to eliminate any super-saturation, there is a resulting loss of ice mass from the surface of the ice particles which therefore shrink, due to a sublimation process.

Contrail particles of smaller initial size/diameter are more likely to be completely eliminated within the wingtip vortex than larger contrail particles. If the initially forming contrail, prior to entrainment in a vortex, features a greater number density of ice particles, it will contain a greater proportion of smaller ice particles and as a result a greater proportion of ice particles will be lost during adiabatic heating within the vortex. Hence the increase in optical depth, attributable to the greater initial number of ice particles, of the post-vortex contrail will be less than the increase in optical depth of the pre-vortex contrail. Accordingly, it is proposed as part of this disclosure to account for net benefit in contrail optical depth for the aircraft according to the number of ice particles becoming entrained within the vortex flow relative to those contained within the secondary wake.

For a particular engine, the invention varies the number density of pre-vortex contrail ice particles by influencing processes within the gas turbine engine. Such engine-driven processes may concern the engine exhaust emissions, for example the combustion process, which affects the soot content in the exhaust flow. The exhaust emissions, such as the particulates therein, create nucleation sites for condensation, which in turn affects the number of ice particles formed. The invention focuses on control of the engine operation, and particularly the combustion process, to control exhaust emissions. In particular the invention proposes varying control of the soot emission index of, and/or the rate of production of soot particles by, the engines onboard the aircraft.

Aircraft Engine Configurations

FIG. 2 shows an aircraft 2 comprising a fuselage 4 and wings 6, each wing producing a wingtip vortex 8. Engines 10 are mounted close to the tips of the wings 6, such that the degree of capture and retention by the wingtip vortices 8 of the engine exhaust plumes 12 is significant. As a result, and depending on the ambient humidity levels, a proportion of the contrail particles forming in the region 16 within the engine exhaust plume 12 may be eliminated by heating within the wingtip vortices 8, leading to a reduced optical depth of the contrail at a position 18 some distance downstream.

Each engine 10 may be a gas turbine or a reciprocating combustion engine. Each engine 10 comprises an electrical generator 11 driven by for example a rotating shaft of the engine 10. The electrical generator produces electrical power which can be supplied to one or more electrically-driven fan 20 via cable or cables 44, and/or to one or more energy storage unit 30 via cable or cables 40. As shown in FIG. 2, each fan 20 comprises an electric motor 21, either integrally formed therewith or coupled thereto for driving rotation of the fan 20. The motor 21 may be a motor-generator unit, e.g. to allow unnecessary or unwanted fan rotation to be used to generate energy upon aircraft descent, etc.

The one or more energy storage unit may supply stored energy to the one or more fan 20 (e.g. to the electric motor 21 thereof) via a further cable or cables 42. The, or each, fan 20 produces an outflow 22, typically in which a contrail does not form.

FIG. 3 shows a similar aircraft in which the one or more engine 10 is mounted centrally, in this case at the rear of the fuselage 4 of the aircraft. As a result of the position of the one or more engine, interaction between the one or more engine exhaust plume 12 and the wingtip vortices 8 is negligible, and so the properties of a contrail 16 which may form in the exhaust plume of the engine are not substantially modified by wingtip vortex interaction.

FIG. 4 shows an aircraft 52 characterised by an alternative configuration, sometimes referred to as a "blended wing body" configuration, in which the distinction between the fuselage and wings is less marked. Numbered items are the same as in FIG. 2. As with the aircraft 2, mounting of engines close to or at the wingtips leads to substantial interaction between engine exhaust plumes 12 and wingtip vortices 8. FIG. 5 shows a similar blended wing aircraft 52 in which the one or more engine is mounted adjacent or along a centerline of the aircraft, leading to minimal interaction between the wingtip vortices 8 and the one or more engine exhaust plume 12.

It is to be understood that the above FIGS. 2-5 represent extremes of engine position (i.e. at the wingtips, or as far away as possible from the wingtips), and that other, intermediate mounting positions could be contemplated, which may produce varying degrees of contrail interaction with wingtip vortices. Other aircraft configurations and/or engine placements and/or fan placements and/or storage-unit placements could be contemplated without departing from the scope of the present invention as defined by the accompanying claims.

Engine Control System

A primary purpose of this disclosure is to provide a control mechanism which manages the rate of fuel flow to the engine or engines 10, in conjunction with the rate of energy flow along connections 40, 42 and 44, so as to modify where possible the properties of contrails produced by one or more of the engine or engines 10.

It is assumed in this invention that electrical energy generated by the electrical generator attached to or within the one or more engine 10 is supplied in the first instance via the cable or cables 44 to the one or more fan 20. In the event that the generator is producing electrical energy at a rate which exceeds the fan's requirements, then the surplus energy is sent via the cable 40 to the energy storage unit 30. In the event that the generator is producing electrical energy at a rate which falls short of the fan's requirements, energy is transferred at an appropriate rate from the energy storage unit 30 via the cable or cables 42 to the fan 20. In the event that the fan may be used as a generator (for example during descent) then energy will be transferred from the fan via the cable or cables 42 to the energy storage unit 30.

In order to implement the control schemes described herein a controller, such as an engine control and/or decision making unit, is provided with suitable machine readable instructions. One or more ambient condition sensor is also provided such that the controller can receive sensor data pertaining to either or both of the presence of a contrail and/or one or more contrail characteristic. One such sensor may be a contrail detection sensor, such as an optical sensor, and could be used to determine the presence and/or optical depth of a contrail downstream of the aircraft. Additionally or alternatively, an atmospheric condition sensor could sense an ambient condition indicative of contrail presence or a contrail characteristic. An ambient humidity and/or temperature sensor could be used. Whilst any such sensors could typically be mounted on an aircraft, in other examples of the invention ambient condition sensing could be performed by remote sensors, such as remote meteorological sensing equipment or imaging equipment, with the results being communicated to the engine controller.

Any of the above described sensors could be combined with sensor readings from conventional engine operation sensors in order to provide the necessary determination of contrail presence and/or severity.

If a contrail is forming in the exhaust plume of the one or more engines, then the controller will determine a suitable course of action according to one or more decision making routines. Prior to determining a change in engine operation in response to contrail formation, an initial decision may be taken as to whether or not contrail mitigation action is warranted. If ambient air is not ice super-saturated (that is, if RHi<100%, where RHi refers to relative humidity with respect to ice) then the contrail's climate impact is limited by its short lifetime, and so it may be preferable not to attempt any specific contrail mitigating action in response to the instantaneous conditions. However changes to a normal/default mode of operation may be made to accommodate the likelihood of later contrail mitigation as will be described hereinbelow.

A further fundamental decision that may be taken prior to altering engine operation is whether contrail optical depth should be reduced or enhanced. This is based upon an assessment of the likely balance between long-wave warming and short-wave cooling over the expected lifetime of the contrail, taking account of factors discussed elsewhere in the present document.

If reduction (rather than enhancement) of contrail optical depth is deemed the more advantageous action, it may (in specific circumstances) be possible to suppress contrail formation altogether by altering the engine throttle far enough away from a normal operation mode that the resulting reduction in engine efficiency is such that contrail formation does not take place. If suppression is feasible, it may yield a bigger climate advantage than optical depth reduction. However, the relative benefits and efficiency penalties must be taken into account and this disclosure accommodates both contrail osed throttle settings lying within the zone of acceptability, For operation of the control For operation of the control systems described herein, it is assumed that the power drawn from or absorbed by the energy storage unit is adjusted in response to a change in engine throttle setting(s) such that the total thrust provided to the aircraft meets the instantaneous aircraft thrust requirements, for example as instructed by aircraft cockpit controls. This may involve a change in power supplied to the remote fan(s) so as to compensate for any change in thrust from the engine(s) as a result of the throttle adjustment. The scope for contrail mitigation thus resides within the available range of propulsion system settings that satisfy the aircraft thrust demands.

Various examples of instantaneous use of the invention to control the propulsion systems of FIGS. 2-5 are given below. In such cases relatively small changes are made to the engine throttle setting such that there is no transition between the regions 100, 102 and 104 of FIG. 1. However, it will be appreciated that such transitions could in all cases be contemplated, thus allowing significant changes in engine throttle setting (and hence in the charging or discharging rate of the energy storage unit) without significant changes in the number of soot particles emitted per meter of travel. In particular, a transition from region 100 to region 104 could allow a reduction in soot emissions while at the same time enabling charging of the energy storage unit. The following examples are therefore illustrative of the more general approach described herein.

For each example a potential change to engine operational settings is contemplated in response to the current engine operation point and the sensed atmospheric condition, typically the level of ice super-saturation in the ambient air. This atmospheric condition in particular gives an indication of whether or not a contrail, if formed, is likely to persist.

Figure 2:
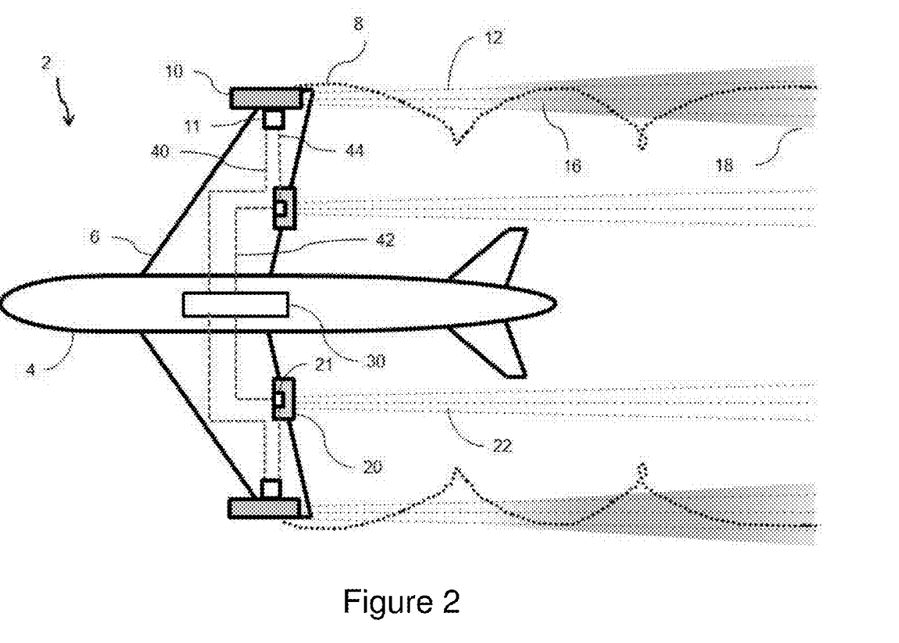
FIG. 2 shows a first example of an aircraft propulsion system according to the invention.
Figure 4:
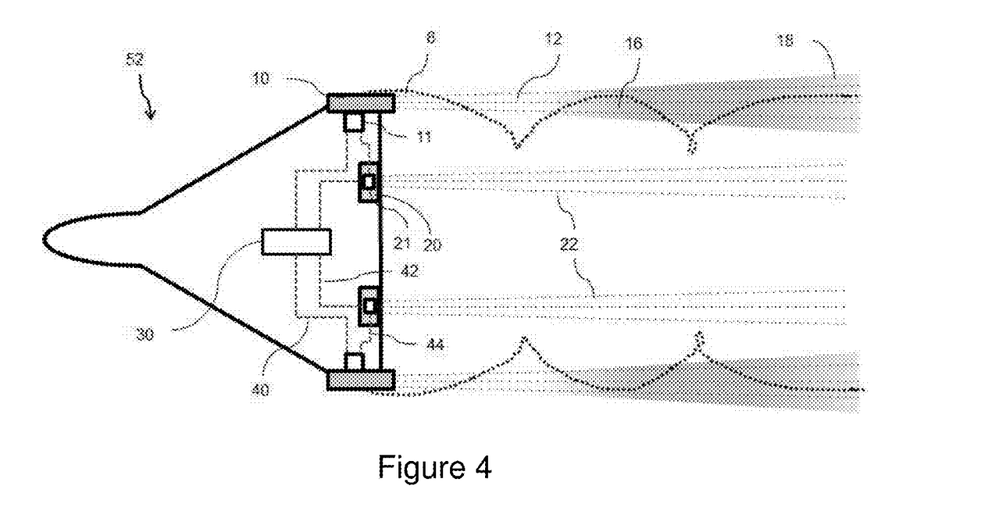
FIG. 4 shows a third example of an aircraft propulsion system according to the invention.

Turning to the example of FIG. 2 or 4, for a scenario in which it is desirable to reduce contrail optical depth where one or more engine 10 is mounted such that the exhaust plume 12 is strongly (or entirely) captured by the aircraft's wingtip vortices 8, the following general operational controls may be determined:

For a positive variation of $EI_{soot}$ with increased engine throttle (i.e. region 100 from FIG. 1), if ambient ice-super-saturation (i.e. the extent to which RHi exceeds 100%) is:

Low: the wingtip-vortex may eliminate all of the pre-vortex contrail ice particles, and so no contrail-reduction action is required. If the ambient super-saturation level is low enough, it may even be possible to increase the throttle, e.g. to charge the energy storage unit, whilst maintaining the substantially complete elimination of ice particles within the vortex.

Medium: a low number of pre-vortex particles may survive the wingtip vortex flow field, resulting in a low optical depth contrail. It may be possible to reduce engine throttle and thus decrease contrail optical depth. Alternatively it may be preferable to avoid degradation to engine efficiency and implement no change to engine operation.

High: relatively low loss of ice particle numbers occurs within the vortex. In order to achieve a reduction in contrail optical depth, the number of pre-vortex particles must be reduced and so the engine throttle is reduced by a substantial amount, with substitute power being drawn from the energy storage unit to drive the electrical fans.

For a negative variation of $EI_{soot}$ with increased engine throttle (i.e. region 104 from FIG. 1), if ambient ice-super-saturation is:

Low: no action required for contrail reduction purposes, but if desired, the engine throttle could be increased, e.g. to charge the energy storage unit.

Medium/high: depending on the gradient of $EI_{soot}$ with throttle (and whether the reduction of $EI_{soot}$ outweighs the efficiency degradation due to increased fuel-flow rate), engine throttle could be increased in order to reduce contrail optical depth. This is likely to be beneficial for high levels of ambient ice super-saturation. Excess power can be diverted to the energy storage unit.

Figure 3:
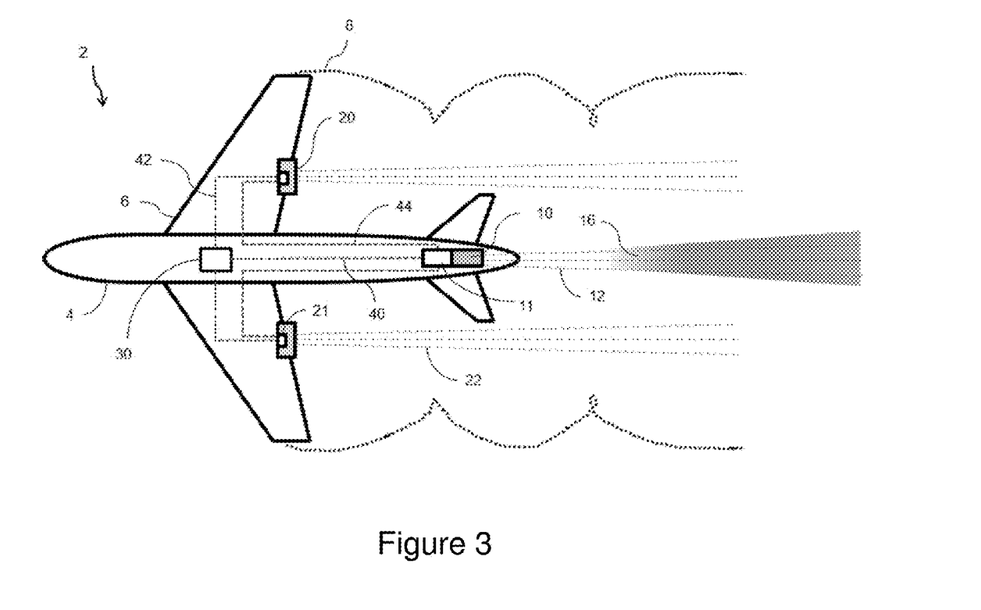
FIG. 3 shows a second example of an aircraft propulsion system according to the invention.
Figure 5:
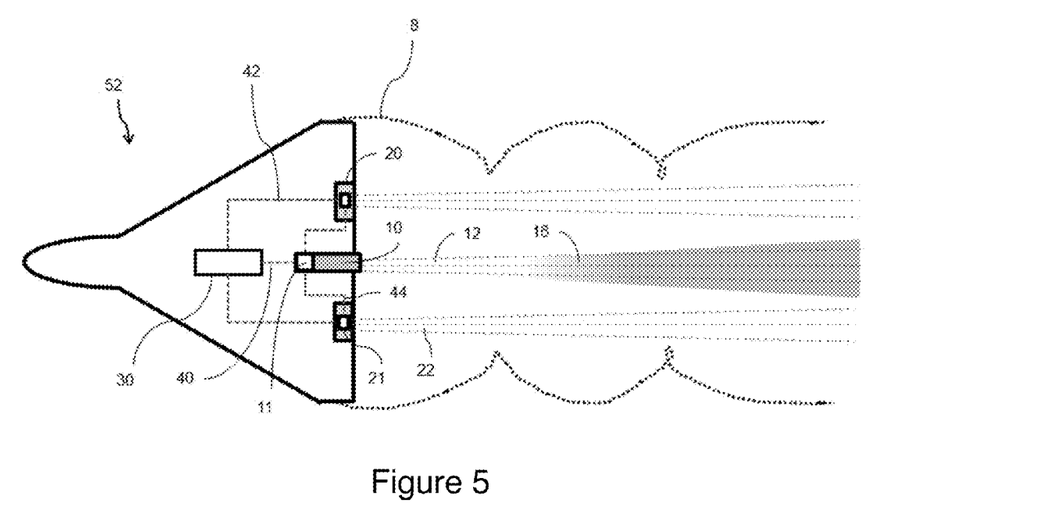
FIG. 5 shows a fourth example of an aircraft propulsion system according to the invention.

Turning to the example of FIG. 3 or 5, e.g. more centrally mounted engine(s), for a scenario in which it is desirable to reduce contrail optical depth where one or more engine 10 is mounted such that contrail formation in the exhaust plume 12 is not substantially affected by the aircraft's wingtip vortices 8, the distinction between low/med/high levels of ambient ice super-saturation is less significant and the following general operational controls may be determined:

For a positive variation of $EI_{soot}$ with throttle, reduce engine throttle (and increase power drawn from the energy storage unit).

For a negative variation of $EI_{soot}$ with throttle, increase engine throttle to reduce optical depth of contrail (and charge energy storage unit).

In contrast to the examples given above, there may be circumstances in which contrail formation is beneficial and in which it is desirable to enhance, rather than reduce, contrail optical depth. In the examples of FIGS. 2 and 4:

For a positive variation of $EI_{soot}$ with increased engine throttle (i.e. region 100 from FIG. 1), increasing the engine throttle setting (and hence soot particle emissions per meter of travel) will result in a greater number of pre-vortex ice particles. The higher the ambient level of ice super-saturation, then the greater will be the corresponding increase in post-vortex ice particle number density (due to elimination of a smaller proportion of the pre-vortex ice particles) and hence in the optical depth of the post-vortex contrail. A suitable extent of engine throttle increase may be determined in dependence upon the level of ambient ice super-saturation.

For a negative variation of $EI_{soot}$ with increased engine throttle (i.e. region 104 from FIG. 1), by the converse of the discussion above, it is proposed to decrease the engine throttle setting (e.g. in dependence upon the level of ambient ice super-saturation) in order to increase contrail optical depth.

For the examples of FIGS. 3 and 5, in order to enhance contrail optical depth, where desirable, the engine throttle would generally be increased up to a maximum desirable point for a positive variation of $EI_{soot}$ with throttle. Conversely, for a negative variation of $EI_{soot}$ with throttle the engine throttle would generally be decreased to a minimum desirable level in order increase contrail optical depth.

It may be desirable to increase contrail optical depth according to incident levels of sunlight, for example during daylight hours, so as to reflect sunlight away from the atmosphere and thereby cause a climate cooling effect. In the absence of incident sunlight, e.g. during the night or else when there is already prevailing cloud cover, it may be preferable to suppress/reduce contrail formation. In any examples of the invention, the ambient sensor(s) may comprise a light, or other radiation, sensor. Additionally or alternatively, a clock may be used to determine local daylight hours.

In-Flight Optimisation

Whilst the above illustrative examples discuss immediate control decisions based on substantially real-time engine/ambient sensor data, a more complete solution may enable calculation of the optimal extent, or available limits, of throttle adjustment and to manage the charge level of the energy storage unit throughout the flight.

In all cases calculations may be subject to a constraint that the charge level in the energy storage unit cannot fall below a minimum threshold. In a simplistic example, the threshold minimum charge level would be zero and would not change between different sections of a flight. In more practicable embodiments, the threshold minimum charge level would vary between sections/portions of a flight and would be dependent upon specific requirements for each flight section and/or each future section as discussed in more detail below.

Three potential broad approaches to in-flight optimisation are proposed, as follows:

A non-predictive, e.g. instantaneous decision process, whereby contrail mitigation action is implemented unless or until it causes a minimum or maximum charge-level threshold for the energy store to be reached.

A priority system, in which the highest-priority parts of the flight are identified and contrail-mitigation action is restricted to those parts. Heuristics may be used to identify the priority flight parts and the priority threshold may be adjusted based on experience or calculations, e.g. specific to aircraft routes, time of year, etc, until the best usage is made of the available energy storage capacity.

A flight section approach, in which the flight is defined as comprising a plurality of sections, each having engine operation characteristics. The distribution of throttle modifications for each section may be optimised subject to the overall constraint that the charge level in the energy storage unit should not at any time fall below a minimum threshold level or rise above a maximum threshold level. The maximum and/or minimum thresholds may vary from section to section. This process may result in a "script", the generation of which is discussed in more detail below.

A "section" or "portion" of a flight may be a flight phase or a different period of the flight throughout which the operating condition can be considered substantially constant. The operating condition can be defined with reference to any or any combination of: engine throttle setting and/or fuel-flow rate; aircraft thrust requirement; ambient temperature, pressure and/or humidity; altitude; solar conditions (strength and/or direction of incoming sunlight); the albedo of the underlying surface (including cloud); the level of charge within the energy storage unit.

Flight Section Approach

The generation of a script in advance of a flight (or in advance of any remaining sections of a flight) allows an optimal distribution of contrail mitigation action to be sought across those sections, such that contrail mitigation steps can be implemented at maximum effectiveness across the duration of the combined sections. In the event that the actual flight (e.g. in terms of the route followed, the altitude profile followed, or the atmospheric conditions encountered) differs from that expected when the script generation takes place, the script may be recalculated for the remainder of flight.

The following procedure identifies the most advantageous throttle settings for use at each point of the flight, taking account of fuel burn, contrail-mitigation, and constraints on the energy storage unit's charge level. The procedure makes use of details concerning the proposed flight routing and altitude profile, and optionally the expected weather conditions. The procedural steps may be taken in order as follows:

Identify section boundaries.

Calculate the default throttle setting(s) for each section (i.e. which would be employed in the absence of contrail mitigation), and hence the total mission fuel burn or other engine efficiency measure for this default case.

Calculate (or retrieve from a data store) the maximum and minimum allowed charge levels of the energy storage unit for each section.

Identify those sections in which contrail mitigation action is meaningful and/or desirable. In general this will involve identifying those sections in which contrail formation is possible (according to ambient/weather conditions and engine efficiency at the default throttle setting for that section). Additionally or alternatively, sections may be identified only where contrail persistence is possible as discussed above.

Iteratively:
  Propose one or more throttle profile (i.e. potentially for each engine individually or all engines collectively), each such profile comprising a proposed throttle setting for each of the sections of the flight. A throttle setting proposal may take account of one or more constraint as discussed herein. The proposed throttle setting may offer either a contrail-related benefit for that section or else beneficially impact the charge level in the energy storage unit in readiness for one or more subsequent section of flight in which contrail mitigation action may be required. Alternatively, for some sections of flight the proposed throttle setting may be identical to the default throttle setting.
  Calculate the fuel use in each section, e.g. including any weight change due to fuel burn, and the total mission fuel burn for the proposed throttle profile. Also calculate the required thrust for each section, taking account of aircraft weight.
  Rank or score the viability of the proposed throttle profile, e.g. by comparing engine efficiency or fuel burn against the default profile and/or available fuel capacity. If script generation is carried out prior to a flight, then the total, or total available fuel capacity of the aircraft may be considered. If the script generation is being carried out during a flight (for example in response to a change in route or in weather conditions versus those expected prior to the flight), then a remaining fuel capacity may be considered. Fuel capacity consideration may accommodate a reserve/emergency fuel allowance.
  Rank or score the contrail-related benefit for each identified section of the non-default throttle setting.
  Combine the contrail-related benefits/costs with the fuel/efficiency penalties to obtain a total penalty or benefit for the flight as a whole. Optionally, one could also take account of additional maintenance burdens associated with the proposed throttle profile relative to the default profile.
  Retain a proposed profile as the preferred profile if it improves upon the total penalty/benefit for default profile, until it is superseded by a better proposed profile during a subsequent iteration.
  Optionally use the total penalty or benefit as the basis for identifying a new proposed throttle profile, e.g. using an optimisation algorithm.
Stop iterating (i.e. stop proposing and evaluating new throttle profiles) when any or any combination of the following is/are met:
  The number of iterations or calculation time has exceeded a predetermined threshold.
  The current preferred throttle trajectory discovered has been retained for a predetermined number of iterations or elapsed calculation time.
  Any total penalty/benefit improvements between previous and current preferred profiles are below a predetermined threshold.
Use the preferred throttle profile as the basis for assembling the script. For the case where the script is being generated in advance of the flight, any change in fuel requirements for the flight may also be determined in readiness for fuel loading.

Generating a Proposed Engine Operation Profile

In order to generate a proposed throttle setting for a section of the flight, limits are applied, e.g. so as to define the region in which candidate throttle settings may lie. The limits may comprise maximum and minimum (e.g. idle) throttle settings for the engine(s), and/or maximum/minimum charge levels for the energy storage unit.

A maximum charge limit, e.g. at the end of one flight section, may be lower than the maximum capacity of the energy storage unit, for example to ensure that there is capacity to absorb energy during a later section, such as descent. A minimum charge limit may be non-zero, for example to ensure that sufficient charge is available for emergency maneuvers and/or efficient operation during standard flight section maneuvers. The energy storage unit may be required to deliver energy to the propulsive fan(s) at certain points of the flight as standard (for example during take-off, climb-out, top-of-climb, step-climbs) in order to supplement the power being delivered by the one or more engine.

Each flight section may have maximum and/or minimum energy-store charge-level limitations at its start and/or its end, for example defining a max/min charge profile over the course of the flight. This may bound the scope of the search for an optimal thrust profile.

Figure 6:
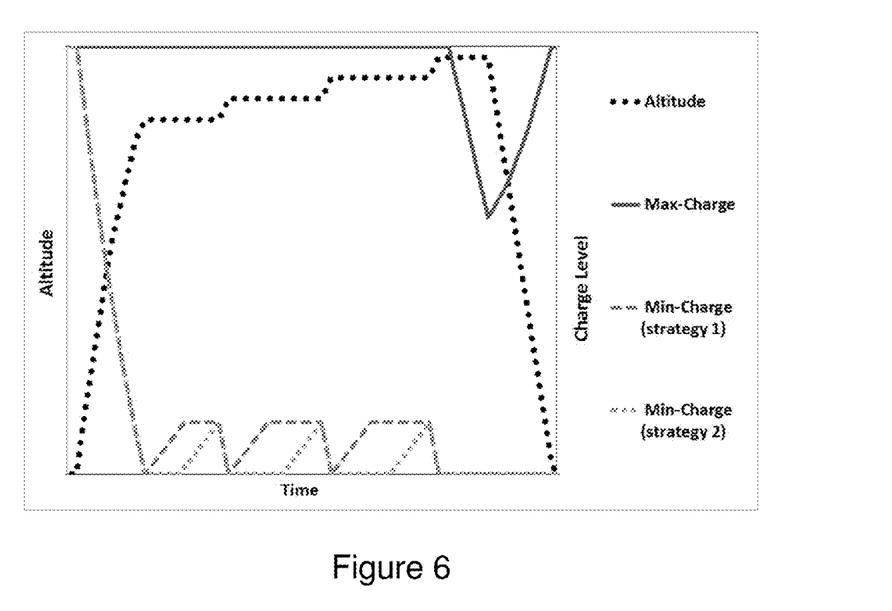
FIG. 6 shows an illustrative example of minimum and maximum charge thresholds in relation to an aircraft's phase of flight represented by altitude.

FIG. 6 illustrates a notional maximum charge-level trajectory and two examples of a notional minimum charge-level profile, defining a zone in which the actual charge level trajectory must lie. In FIG. 6, the first example minimum trajectory prepares the energy storage unit for step-climb as early as possible, so as to reduce fuel weight at the earliest opportunity and to maximise flexibility in case the step-climb is required earlier than anticipated. The second example minimum trajectory maximises contrail-mitigation flexibility by allowing the preparation for step-climb to be delayed (if there is an advantage in doing so) until the latest possible time (i.e. just in time for the planned step-climb).

The above considerations place upper and lower bounds on the range of charging/discharging rates that can be contemplated for the section. In conjunction with the total thrust requirement, this then places upper and lower bounds on the range of engine throttle settings that can be contemplated.

Since the maximum and/or minimum charge profiles are specific to the flight rather than to a proposed throttle profile, a sequence of throttle setting values proposed by an optimisation algorithm can be interpreted as referring to proposed throttle settings lying within the zone of acceptability, according to standard optimisation practice. Alternatively, the assessment of a proposed throttle setting could apply a penalty if the proposed throttle setting falls outside the band of acceptability.

Assessing Contrail-Related Benefits

Below are described a number of embodiments of systems and methods for determining the desirability of a change in engine operation for contrail mitigation. In a general sense, such systems aim to provide an assessment, such as a ranking or score that reflects the advantageous climate impact of contrail modification in combination with any engine efficiency or fuel burn penalties associated with moving engine operation away from a default, typically optimal efficiency setting. Such assessments could be performed as part of the script-generation process described above or else in other predictive or reactive examples of the invention, in order to assess possible engine operation changes for individual flight sections or other parts of a flight, for example including an aircraft's current flight section/phase.

Figure 7:
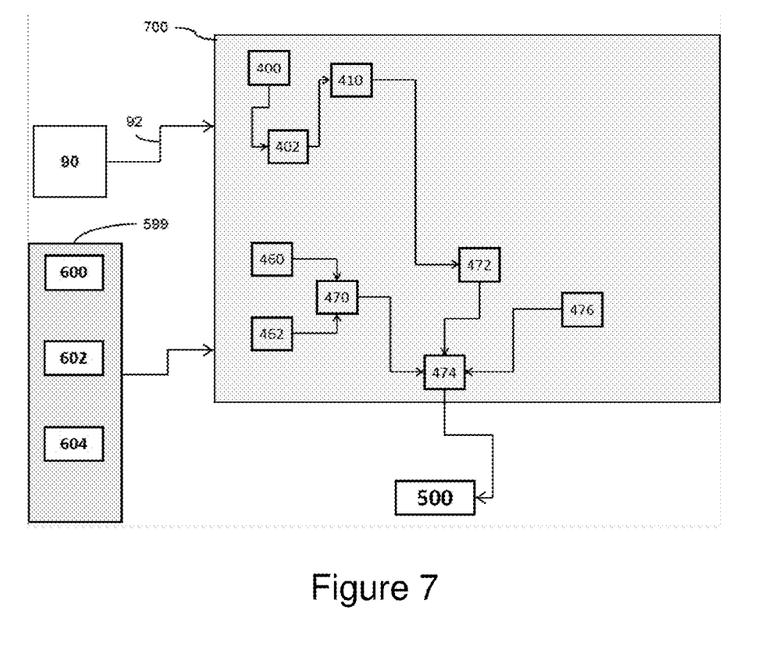
FIG. 7 is a first example of a system for determining the desirability of a change in engine operation for contrail mitigation.
Figure 8:
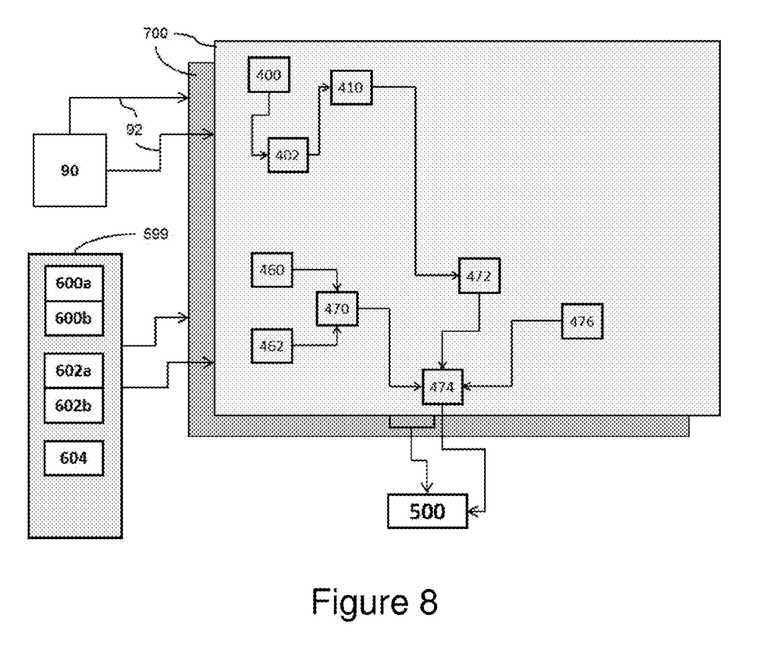
FIG. 8 is a second example of a system for determining the desirability of a change in engine operation for contrail mitigation.
Figure 9:
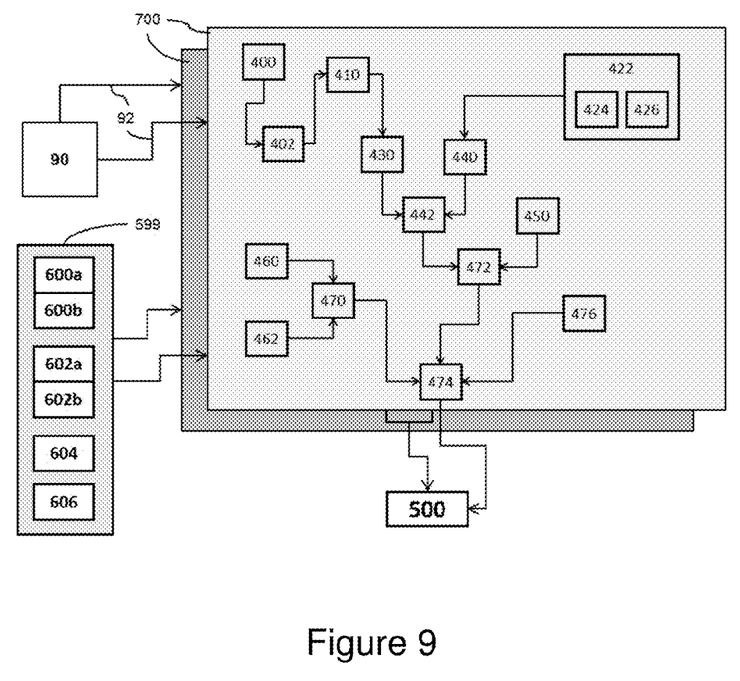
FIG. 9 is a third example of a system for determining the desirability of a change in engine operation for contrail mitigation.

In the examples of FIGS. 7 to 9, the item 90 comprises a source of measured or predicted values for the operational parameters described herein. The value of the proposed throttle setting is determined relative to a situation in which the default throttle setting is applied at a corresponding time/portion of the flight. Depending on the different predictive and reactive scenarios of use of the invention case, the source 90 could comprise a computational model, database and/or a collection of sensors or sensor readings. The output 92 of 90 is a data signal comprising any or any combination of predicted or modelled parameter values and/or sensor readings of real physical quantities taken onboard the aircraft or remotely.

Whilst the examples described herein discuss modification of engine throttle settings in order to affect contrail modification, it will be appreciated that engine throttle settings impact a number of associated engine operation parameters, such as fuel flow, airflow to the combustor, engine rotational speed, adjustable vane settings, or the like, and that any other such parameters for controlling engine operation could be used in order to impact the combustion temperature and/or engine efficiency and thereby bring about the required change in engine operation for the purpose of the invention.

The example of FIG. 7 assumes that the level of interaction between the engine exhaust plume and the aircraft's wingtip vortices can be considered negligible and that there is a single engine, or else a plurality of engines under common operation, e.g. such that each engine receives the same concurrent control instructions in order to operate in unison. In FIG. 7, a collection of process input parameters is shown at 599, comprising:
 a proposed throttle setting value 600
 default engine throttle setting value 602
 the proposed duration 604 of the proposed throttle setting 600 (i.e. the duration of the section of the flight to which 600 and 602 pertain).

The calculation unit 700 comprises one or more computer processor programmed with one or more module of machine-readable code to perform a collection of calculation steps necessary to assess the net contrail-related benefit associated with applying a proposed throttle setting for a proposed length of time. Any or all of the process input parameters within the collection of process input parameters 599 are available to any or all of the calculation steps within the calculation unit 700.

In this example 90 is a collection of sensors themselves or measured/predicted sensor readings made available at 92 to calculation steps 700. The sensor readings 90 may comprise aircraft airspeed and physical location, ambient pressure, ambient temperature, and/or ambient relative humidity, and engine performance measurements. The collection of readings 90 may also comprise the strength and/or direction of incoming sunlight, the extent of ambient turbulence and/or stratification, and/or the presence of cloud coverage at the aircraft location.

The term 'model' used herein refers to any or any combination of one or more algorithm, database, lookup table for determining the relevant parameters from the available input data, i.e. for performing at least one calculation set contributing to the systems described herein. A computational model 400 is for the engine's soot emission index (number of soot particles emitted per unit mass of fuel burned) under the current ambient atmospheric conditions, in dependence upon a throttle setting (or fuel-flow rate) and engine performance measurements.

402 is a model from which can be determined the number of soot particles emitted by an engine per unit distance traveled, in dependence upon engine fuel-flow rate (or throttle setting), aircraft speed, and the determined soot emission index.

410 is a model from which can be determined the initial particle size distribution of ice particles formed in the exhaust plume of an engine, in dependence upon ambient temperature, ambient pressure, ambient humidity, the determined number of emitted soot particles per unit distance of travel, and the mass of water vapour emitted by the engine per unit distance of travel (the latter being calculated from the engine fuel-flow rate, aircraft speed and fuel properties).

460 is a model from which can be determined the strength and orientation of incoming sunlight over the expected lifetime of the contrail.

462 is a model from which can be determined the albedo of surfaces (including other clouds) which would receive incoming sunlight in the absence of a contrail formed by the aircraft, in dependence upon the aircraft's location, sensor readings concerning underlying, and/or the determined orientation of incoming sunlight.

470 is a model which determines the time-integrated radiative forcing due to short-wave (i.e. cooling) effects over the expected lifetime of the contrail, in dependence upon the values determined by models 460 and 462.

472 is a model which determines the time-integrated radiative forcing due to long-wave (i.e. warming) effects over the expected lifetime of the contrail, in dependence upon values determined by model 410.

474 is a model which determines the net benefit of the difference between 1) the determined short-wave and long-wave effects and 2) reference short-wave and long-wave effects. The reference short-wave and long-wave effects are calculated assuming the default throttle setting 602 using the same procedure as above. In some embodiments, the climatic benefit/penalty may be assessed using financial penalties for negative climate impact. Accordingly a scientific assessment may be replaced with a corresponding financial assessment, e.g. as substitute indicator of climate impact, which may be calculated in dependence upon a tariff 476.

The example of FIG. 8 accommodates the possibility that the operation, e.g. throttle, of individual engines within a multi-engine system can be adjusted independently. The motivation for this stems from the likelihood that 1) the dependency of $EI_{soot}$ upon thrust/throttle setting is non-linear, and 2) the efficiency of the engine core will change with throttle setting. As a result it may be possible to achieve a certain level of reduction in soot emissions with a smaller fuel-burn penalty, by varying the throttles of the more than one engine independently of each other, rather than adjusting them all to identical settings. In this example it is assumed that there is negligible interaction between the engine exhaust plumes and the aircraft's wingtip vortices, e.g. if the engines are sufficiently spaced from the aircraft's wingtips.

FIG. 8 is similar to FIG. 7 and like numerals are used for like features. However, in contrast to the single proposed throttle setting 600 in FIG. 7, FIG. 8 has a first proposed throttle setting 600a for a first engine or group of engines, and a second proposed throttle setting 600b for a second engine or group of engines. Similarly, two default throttle settings 602a and 602b are provided in respect of each engine or group of engines.

In view of the potential for variable operation of a plurality of engines, there is a corresponding plurality of instances of the collection of calculation steps 700. Each instance performs calculations for an engine or group of engines. The first instance uses values 600a and 602a, while the second instance uses input 600b and 602b. This allows each set of calculations 700 to be performed in parallel. In other examples, a single instance of calculation steps 700 could perform calculations for the first and second engines, or engine groups, in series. Regardless of which calculation route is used, the total benefit 500 is in the multi-engine case determined by combining the results for each engine or engine group, e.g. taking account of the number of engines in each category. In one example the results could be combined by addition, or else a more complicated calculation could be performed to take account of the merging of contrails from adjacent engines.

In the example of FIG. 9, as well as the possibility of a plurality of independently operable engines, the possibility of interaction between the engine exhaust plumes and the aircraft's wingtip vortices is accommodated. In addition to the features of FIGS. 7 and 8, the system of FIG. 9 has features discussed below.

The aircraft weight 606, e.g. for the section being considered, is determined or retrieved so as to provide a further input into calculation process 700. This takes account of the amount of fuel burned so far during the flight and may be used in determining the strength of the wingtip vortices.

Computational model 422 determines the altitude reduction which will be achieved by the wingtip vortex prior to its breakup. This model may comprise a sub-model 424 which determines the lifetime of a wingtip vortex in dependence upon such factors as the strength of ambient turbulence and/or stratification, the rate of change of ambient temperature with altitude, and/or the instantaneous aircraft weight 606; and a model 426 which determines the downward velocity of a wingtip vortex, in dependence upon factors including the instantaneous aircraft weight 606, and aircraft configuration.

Model 430 determines the extent to which particles in the engine exhaust become captured by the wingtip vortex. This may be achieved by determining the particle size distribution of ice particles initially captured within the wingtip vortex core, given the initial particle size distribution of a newly formed contrail, in dependence upon the location of the corresponding engine relative to the wingtip.

Model 440 determines the temperature change likely to be experienced within the vortex core as a result of the determined change in altitude during its descent and/or the speed of its descent, in dependence upon ambient temperature and pressure.

442 is a model which, when supplied with an initial ice particle size distribution, determines the number of ice particles which remain after the adiabatic heating experienced within the wingtip vortex core during the lifetime of the wingtip vortex. The number of remaining ice particles also includes those ice particles which were detrained from the vortex prior to its breakup. The number of surviving ice particles is determined in dependence upon the estimate of the temperature change attributable to descent of the wingtip vortex, taking account of ambient pressure, temperature and humidity.

450 is an optional model from which can be determined the proportion, of ice particles not captured/retained by the wingtip vortex core, which experience sufficient adiabatic heating in the region of downwash between the aircraft's wingtip vortices so as to be eliminated.

The individual models of FIGS. 7-9 are described for completeness in order to explain the various considerations that may be required in order to generate a suitable calculation for instructing whether and how best to mitigate contrail formation. In a practical implementation of the invention, any or any combination of the models described in FIGS. 7 to 9 may be optional, for example being summarized or combined in a simpler model definition for defining total benefit 500, or else being omitted from the calculation altogether based on a more basic assumption of the relevance of the associated parameter(s), e.g. specific to a particular aircraft configuration and/or flight path.

As an alternative to at least some of the above calculations, the total benefit 500 of a proposed throttle setting may instead be assessed by implementing the proposed throttle setting and observing the formed contrail. Measurement of contrail optical properties may be used to inform a calculation of any benefit obtained, taking account of the contrail's expected lifetime.

Fleet Management

In an attempt to alter contrail optical depth, control schemes according to the present disclosure may bring about changes to engine fuel-flow rates, away from a default mode of operation that would typically minimise mission fuel burn. The magnitude of any fuel burn penalty by way of the above-described control systems will be specific to the particular contrail-mitigation requirement of each flight. Accordingly, the amount of fuel loaded onto each flight may need to be increased to take account of the expected flight-specific contrail mitigation requirement. It is proposed to calculate or estimate the contrail mitigation requirement in advance of the flight.

If the script-generation process described above is carried out prior to fuel-loading, then the required amount of additional fuel can be determined and loaded on to the aircraft. In this way, the most advantageous distribution of additional fuel between the various aircraft within a commonly-managed fleet can be sought. If script generation is not used, then a simplified fuel estimation process can be used, for example according to one or more assumptions or correlations between flight parameters and contrail mitigation requirements. Any such methods would take account of at least the proposed route, altitude profile and forecasts of ambient conditions to be encountered. Advantageously, accurate determination of the correct amount of additional fuel enables contrail-mitigation opportunities to be pursued, but without introducing needless weight into the aircraft as a result of loading too much additional fuel.

It may also be advantageous to install additional energy unit storage capacity onto certain aircraft, either on a flight by flight basis, or perhaps for certain routes in particular seasons. Additional energy storage would enable greater freedom of contrail optical-depth modification, but would incur extra weight, and so prioritization would be given to those flights which can benefit most in terms of additional contrail mitigation capacity. The script-generation process can be run more than once for a flight, each time with a different level of assumed energy storage capacity, to establish the most advantageous quantity of energy storage for that flight. When considering a collection of flights the prioritization of additional energy storage capacity between flights could also be achieved through multiple runs of the script-generation process, each run contemplating a different allocation of additional energy storage capacity between multiple aircraft.

In summary, examples of the invention described herein allow control of engine operation in conjunction with the charge/discharge rate of an electrical energy store so as to achieve adequate thrust via an electrically driven propulsive fan, whilst also offering the ability to mitigate the detrimental effects of contrail formation, or promote beneficial effects. A combustion/throttle setting of the engine can be modified in order to change the rate of soot particles emitted to the atmosphere, whilst modifying the rate of energy supplied to or extracted from an energy storage unit so as to maintain the thrust provided to the aircraft by the fan and engine combined.

As described above, the present invention is suitable for aircraft with any number of engines, including a single engine architecture and architectures where the propulsive rotor is co-located with the combustion engine.

This invention may enable a material reduction in aviation's climate change impact, through the modification of contrail properties. The invention does not incur any substantial equipment weight over and above a conventional distributed propulsion system and thus offers low ongoing SFC penalty for implementation. Unlike contrail-avoidance measures related to diversion around/above/below regions of ice-super-saturated air, this invention does not introduce any reduction in airspace capacity, nor does it present any additional workload to air traffic control.

The invention claimed is:

1. An aircraft propulsion system comprising:
a combustion engine;
an electrical generator that is driven by the combustion engine;
an electrical energy store;
a propulsive rotor that is driven by an electric motor; and
a controller that selectively varies a supply of power to the electric motor from at least one of the generator and the electrical energy store in dependence on one or more property of a vapour trail selected from a measured optical depth, a calculated optical depth and an expected lifetime of a contrail resulting from an engine exhaust flow.

2. An aircraft propulsion system according to claim 1, comprising a plurality of engines, wherein the operation of each engine is independently controllable by the controller.

3. An aircraft propulsion system according to claim 1, wherein the controller controls one or more combustion parameter for the combustion engine so as to alter at least one of a rate of soot particle production by the combustion engine and an engine efficiency.

4. An aircraft propulsion system according to claim 1, wherein the controller controls engine throttle.

5. An aircraft propulsion system according to claim 1, wherein the combustion engine has a default mode of operation and the controller alters operation away from said default mode of operation in response to the one or more vapour trail property.

6. An aircraft propulsion system according to claim 5, wherein the default mode of operation meets a combined thrust output demand for the propulsive rotor and the combustion engine and the controller varies a ratio of a total electrical power supplied to the electric motor between the generator and the electrical energy store concurrently with changes to the thrust output of the combustion engine in order to maintain said demanded combined thrust output.

7. An aircraft propulsion system according to claim 1, wherein the system comprises a contrail detection sensor.

8. An aircraft propulsion system according to claim 1, wherein the system comprises one or more ambient condition sensor and the controller controls the supply of power to the electric motor according to one or more sensed ambient condition indicative of a contrail property.

9. An aircraft propulsion system according to claim 8, wherein the ambient condition sensor comprises any or any combination of a temperature sensor, a humidity sensor and a sunlight sensor.

10. An aircraft propulsion system according to claim 8, wherein the sensed ambient condition comprises the level of super-saturation of ambient air with respect to ice.

11. An aircraft propulsion system according to claim 9, wherein the controller alters engine operation to reduce or increase engine soot emissions according to a sunlight level determination.

12. An aircraft propulsion system according to claim 1, wherein the controller controls the supply of power to the electric motor according to at least one of a maximum charge threshold and a minimum charge threshold for the electrical energy store.

13. An aircraft propulsion system according to claim 12, wherein at least one of the maximum charge threshold and the minimum charge threshold is variable over the course of a flight so as to define a charge threshold profile which limits the scope of power supply changes available to the controller in a transient manner.

14. An aircraft propulsion system according to claim 1, wherein the controller controls the supply of power to the electric motor according to a predetermined profile for one or more operational parameter.

15. An aircraft propulsion system according to claim 1, wherein a flight is divided into a plurality of sections and the controller controls the supply of power to the electric motor according to a predetermined profile for one or more operational parameter in each section.

16. An aircraft propulsion system according to claim 1, wherein a flight is divided into a plurality of sections according to a predetermined likelihood of contrail mitigation or degree of contrail mitigation being required for each section and the controller sets operational limits of at least one of the combustion engine and a charge threshold for the electrical energy store for each flight section in advance.

17. An aircraft propulsion system according to claim 1, wherein the controller varies the supply of power to the electric motor according to a predicted or measured contrail characteristic due to interaction of the engine exhaust flow with an aircraft wake flow.

18. An aircraft propulsion system according to claim 17, wherein the aircraft wake flow comprises a wingtip vortex flow.

19. A non-transitory computer readable medium including instructions for control of one or more processor to output control instructions for operation of an aircraft propulsion system comprising a combustion engine, an electrical generator drivable by the combustion engine, an electrical energy store and a propulsive rotor drivable by an electric motor, the instructions that execute a method, the method comprising:
controlling a variation in power supplied from at least one of the generator and the electrical energy store to the electric motor according to a received sensor signal of or determination of one or more property of a vapour trail selected from a measured optical depth, a calculated optical depth and an expected lifetime of a contrail resulting from an engine exhaust flow.

* * * * *